M. & D. HAIN.
Plow Attachment.
No. 209,885.  Patented Nov. 12, 1878.
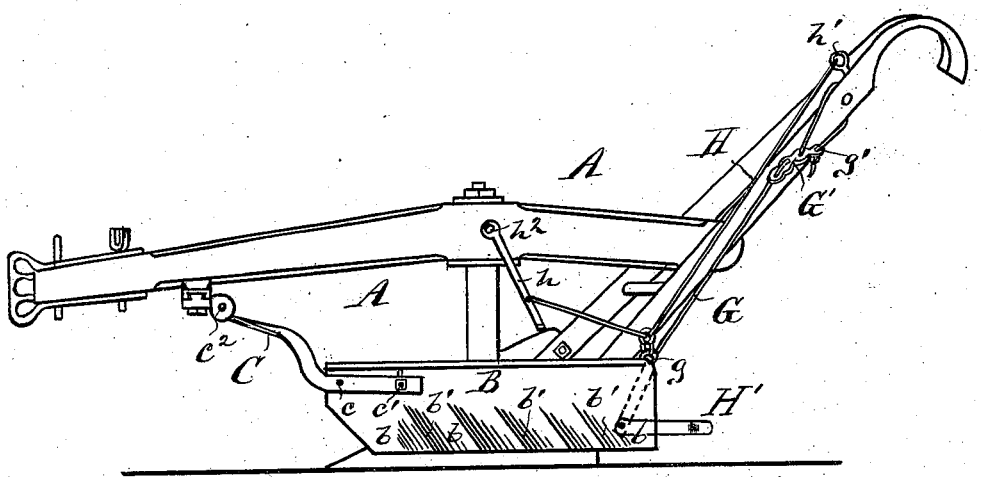
Fig. 1.
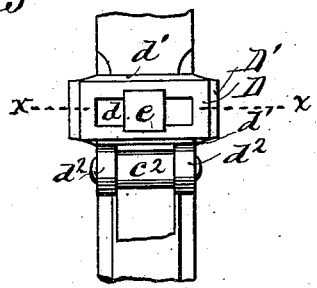
Fig. 5.
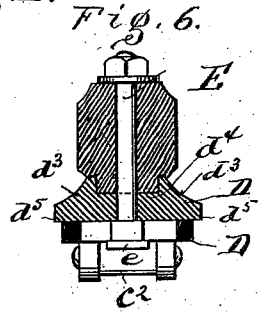
Fig. 6.
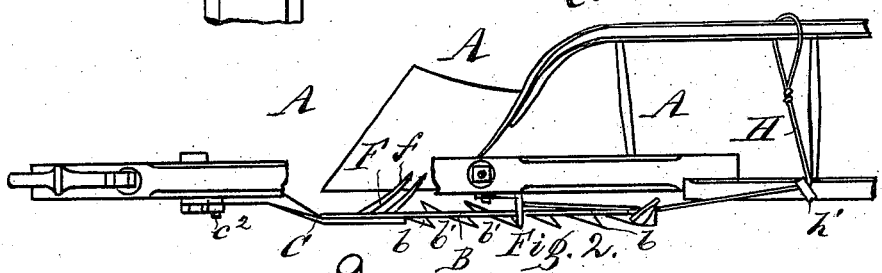
Fig. 2.
Fig. 3.
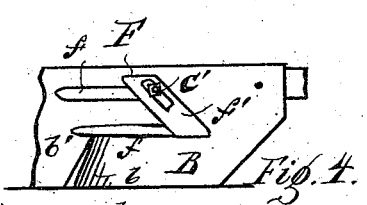
Fig. 4.
Witnesses
J. W. Herthel
Chas Herthel
Inventors:
Martin & David Hain
per Herthel & Co

UNITED STATES PATENT OFFICE.

MARTIN HAIN AND DAVID HAIN, OF HERMANN, MISSOURI.

IMPROVEMENT IN PLOW ATTACHMENTS.

Specification forming part of Letters Patent No. 209,885, dated November 12, 1878; application filed May 20, 1878.

*To all whom it may concern:*

Be it known that we, MARTIN HAIN and DAVID HAIN, both of Hermann, Gasconade county, and State of Missouri, have invented an Improved Plow Attachment, of which the following is a specification:

This invention relates to that class of plows and cultivators having fenders or shield attachments, for the better cultivation of growing plants, such as corn, sugar, tobacco, &c.

Our invention will first be fully described, and the novel features thereof hereinafter pointed out in the claims.

Of the drawing, Figure 1 is a side elevation. Fig. 2 is a top plan. Fig. 3 is an enlarged perspective detail of the casting parts that adjustably connect the end of the fender-bar to plow-beam. Fig. 4 is a side view of the inner face of the forward part of the fender, with the forked device attached thereto. Fig. 5 is a bottom plan of the parts shown in Fig. 3, and Fig. 6 is a sectional elevation on line $x$ $x$ of Fig. 5.

Similar letters of reference indicate corresponding parts in each figure.

A represents an ordinary plow. B is the shield or fender attachment to plow. The fender B is the means for preventing the clods or bowlders upturned by the plowshare from falling against the growing plant while it is being cultivated.

We are aware that fenders for the purpose stated have been attached to plows and cultivators; but we further improve the construction of the said attachment in the manner and to achieve the advantages and results as follows:

Our fender B has its lower edge serrated or cut, and part of the cut edge is bent slightly inward, and the remaining part bent outward from the land-side of the plow, forming the teeth $b$, and between same the inverted V-shaped open spaces $b'$. (See Figs. 1 and 2.)

The purpose of the open spaces $b'$ being chiefly to permit only the finer soil to reach the plant, we prefer that the fender B in its action shall always have its lower edge level or horizontal, and that the soil during plowing, especially the finer or smaller broken parts of the soil, be caused to reach the plant through the open spaces $b'$ instead of passing underneath the bearing-edge of the fender.

The heavier clods, bowlders, or portions of soil liable to choke the growth of the plant are therefore prevented from passing either underneath or through the fender, resulting in a better cultivation of the plant.

C is the connecting bar or arm to attach the forward end of the fender to the plow-beam, the remaining end of the fender being connected to a rope, as will hereinafter appear.

The bar C has its lower end brought sidewise along the side of the fender, and is pivoted thereto at $c$. (See Fig. 1.) By means of the nut and bolt at $c^1$ passing through an elongated slot made in the fender, the extreme lower end of the bar C is adjustably secured to fender. (See Figs. 1 and 4.) Thus pivoting and adjustably attaching the lower end of the bar C to the fender enables us to practically apply the same to very many of the plows and cultivators in use, irrespective of size or dimensions.

In case the standard of the plow is too high or low, the fender can be adjusted to suit the case, and thus avoid the necessity of manufacturing a fender for each and every style of plow or cultivator.

We prefer, for purposes of facilitating the making and hinging of the bar C, to twist its upper end so that its vertical face shall become a horizontal face, and as indicated in Figs. 1 and 2.

At $c^2$ the end of the bar C is hinged to a casting, which consists of two parts, D D', and forms the adjustable attachment to secure the upper end of the bar to the plow-beam. (See Figs. 3, 5, and 6.)

The two parts D D' are related to each other in construction as follows: Each consists of a rectangular-shaped casting, that of D having an elongated opening, $d$, in its body. At $d^1$ are bearing-edges, and at $d^2$ the rear projecting bearings. (See Figs. 3, 5, 6.)

The slot or opening $d$ allows for the lateral adjustment of the casting part D, as will hereinafter appear. The edges $d^1$ receive the contiguous edges of the upper casting, and through the rear bearings, $d^2$, the bolt passes that secures the sleeve end of the bar C to said lower casting part and forms the hinge-joint aforesaid.

D', the upper part of casting, is made to have the side bearings $d^3$, forming the seat $d^4$. The under face of the part D' has the edge bearings at $d^5$, all shown in Figs. 3, 6. The seat $d^4$ impinges the contiguous part of the plow-beam. The bearings $d^3$ engage partly the opposite sides of plow-beam, and hence a bolt, E, passing through the part D' and plow-beam firmly braces said parts together. The same bolt E, Figs. 3, 5, 6, is used to secure the under part, D, adjustably to the upper part, D'. The bolt for this purpose passes through the slot $d$, and said bolt having its lower end square-shaped and terminating with a flanged head, $e$, the latter engages the under face of the casting D, and joins the same to the upper part, D'. (See Figs. 3, 5, and 6.)

When both parts D D' are joined together, the upper face of the former engages the under face of the latter, the respective bearing-edges of each joining each other, (see Fig. 3,) and therefore the only movement that the lower part, D, is capable of is laterally or sidewise. At top of the beam the bolt E is properly secured. To adjust the fender more or less from or to the land-side of the plow, it is only necessary to loosen the bolt E and slide the under part, D, sidewise to the desired position, and resecure the parts by means of the bolt.

The lateral adjustment of the fender is important, for the plant may require more or less soil, or the requirement may be such that it is better to gather the soil closer to the plant; or the fender should be suited with respect to the action of the plow, and otherwise the operator is enabled to suit, regulate, and control the position and action of the fender in accordance with the nature of the plant.

To the inner side of the fender B we attach a forked device, F, of the constructive shape shown in Figs. 2 and 4. The device F consists of two prongs, $f$, forming part of a shank, $f'$. This has a slot corresponding to the same slot at same place in the fender, and through which the same adjusting-bolt $c^1$ passes to secure also the forked device to the fender. This forked device is secured rigidly. Its slot is simply to allow the lower end of the bar C to be adjustably secured to the fender previously described. The forks $f$ project in the direction of the plowshare, (see Fig. 2,) or from the land-side, and the purpose of the said forks is to assist in cutting the fast and sticky soil, also to break the clods and to force the heavier lumps out of the way.

The rear end of the fender has an eye, $g$, to which one end of the cord G is fastened. The other end of the cord is passed through one or more series of holes in the cord-fastener G'. (See Fig. 1.) The cord-fastener consists of a plate having a series of holes, $g'$, (see Fig. 1,) and serves the convenient purpose of securing the loose end of the cord G. The cord G, having been passed as stated, has its loose end further looped around one of the handles of the plow, and finally connects with the cord-fastener. The rear end of the fender is raised or lowered to suit the adjustment of its forward part, and hence the cord G is correspondingly fastened to suit the said adjustment, and thus the fender can be kept horizontal in its action.

H is a similar cord, having one end fastened to the stop $h$. Thence said cord passes through the eye of the fender; thence through the eye at $h^1$; and, finally, is looped over the opposite handle of the plow. (See Figs. 1 and 2.)

The stop $h$ is pivoted at $h^2$. Its lower end projects sidewise over the upper edge of the fender, so as to act as a stop to the same in case any hard substance tends to raise the fender. The operator, by means of the cord H, jerks or lifts the fender occasionally, or when needed to free the same from sticky soil, or to pass over obstructions, &c. The weight of the fender and its connecting parts drops or restores the same to operative position as soon as the cord H is released.

H' is a drag-bar pivoted to the fender, and which can be turned down to trail in the rear of same, (see Fig. 1,) and assist in freeing the fender from clods, &c.

What we claim is—

1. The fender B, having its lower edge cut or serrated, and the cut part bent inward and outward, leaving open spaces $b'$ between teeth $b$, as and for the purpose set forth.

2. The fender B, the connecting-bar C, having one end adjustably secured to the fender, the other end hinged to a casting consisting of the under and upper parts, D D', the former having slot $d$, bearing-edges $d^1$ $d^2$, the latter having bearings $d^3$ $d^5$, seat $d^4$, the bolt E, having flaring head $e$, and plow-beam, all said parts being combined to operate as set forth.

3. The combination of the fender B, the arm or connecting-bar C, the upper and lower castings, D D', the bolt E, the cord G, cord-fastener G', the stop $h$, and the cord H, all said parts being constructed to operate in the manner and for the purpose set forth.

In testimony of said invention we have hereunto set our hands.

MARTIN HAIN.
DAVID HAIN.

Witnesses:
WILLIAM M. HERTHEL,
JOHN W. HERTHEL.